United States Patent
Ogasawara

(10) Patent No.: US 7,499,386 B2
(45) Date of Patent: Mar. 3, 2009

(54) ABERRATION CORRECTION APPARATUS, AND CONTROL APPARATUS, CONTROL METHOD AND CONTROL PROGRAM OF OPTICAL PICKUP

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 619 days.

(21) Appl. No.: 11/177,638

(22) Filed: Jul. 11, 2005

(65) Prior Publication Data
US 2006/0028959 A1 Feb. 9, 2006

(30) Foreign Application Priority Data
Jul. 9, 2004 (JP) ............................. 2004-203048

(51) Int. Cl.
*G11B 7/00* (2006.01)
(52) U.S. Cl. ............... 369/53.2; 369/112.02; 369/44.23
(58) Field of Classification Search ............. 369/112.01
See application file for complete search history.

(56) References Cited

U.S. PATENT DOCUMENTS

| | | | |
|---|---|---|---|
| 5,886,496 A * | 3/1999 | Furukawa et al. | 369/53.19 |
| 6,137,754 A * | 10/2000 | Furukawa et al. | 369/44.32 |
| 6,430,130 B1 * | 8/2002 | Furukawa | 369/53.19 |
| 6,625,102 B1 * | 9/2003 | Hashimoto | 369/112.16 |
| 6,940,798 B2 * | 9/2005 | Noborimoto et al. | 369/53.22 |
| 6,975,574 B2 * | 12/2005 | Yanagawa et al. | 369/53.19 |
| 2002/0006089 A1 * | 1/2002 | Aikoh et al. | 369/53.19 |
| 2002/0085467 A1 * | 7/2002 | Noborimoto et al. | 369/53.22 |
| 2004/0202075 A1 * | 10/2004 | Ojguri | 369/53.14 |

FOREIGN PATENT DOCUMENTS

| JP | 10-289465 | 10/1998 |
|---|---|---|
| JP | 2001-273663 | 10/2001 |

* cited by examiner

*Primary Examiner*—Joseph H Feild
*Assistant Examiner*—Christopher R Lamb
(74) *Attorney, Agent, or Firm*—Young & Thompson

(57) ABSTRACT

An aberration correction apparatus includes an optical pickup having a liquid crystal panel which gives a phase difference to a light beam emitted from a light source unit and irradiated onto a recording medium and corrects an aberration occurring to the light beam by a tilt of the recording medium, and a control unit which applies, to the liquid crystal panel, a correction voltage correspondent to an amount of the aberration in reference to a bias voltage. The bias voltage is set for each of the recording mediums so that the correction voltage applied for correcting the aberration of the same amount caused by the disc tilt becomes equal for different kinds of recording mediums. Namely, even when the plural kinds of recording mediums are used, if the disc tilt angles are same, the aberration can be corrected by applying the same correction voltage. Therefore, by using a control circuit for applying the correction voltage, the control can be executed with the same resolution irrespective of the kind of recording medium, and aberration correction accuracy of each recording medium can be improved.

15 Claims, 13 Drawing Sheets

<NO DISC TILT>

<DISC TILT +SIDE>

<DISC TILT −SIDE>

ABERRATION CORRECTION APPARATUS, AND CONTROL APPARATUS, CONTROL METHOD AND CONTROL PROGRAM OF OPTICAL PICKUP

BACKGROUND OF THE INVENTION

1. Field of the Invention

The present invention relates to an optical pickup having a liquid crystal panel for correcting an aberration.

2. Description of Related Art

As to an optical pickup, there is a known technique of mounting a liquid crystal element such as a liquid crystal panel thereon in order to correct various aberrations caused by inclination of an optical disc (also referred to as "disc tilt"), a difference in thickness between different optical discs such as a CD and a DVD and so on. For instance, in the case of the optical pickup described in Japanese Patent Application Laid-Open No. 10-289465, an aberration correction (a so-called tilt correction) to the inclination of the disc is performed by providing wavefront aberration correcting means comprised of the liquid crystal panel on a light path between a laser source and an objective lens. The liquid crystal panel as the wavefront aberration correcting means has its electrodes divided into forms corresponding to wavefront aberration distribution caused by a tilt angle of the optical disc. Different voltages are applied to the divided portions to give different refractive indexes, and a phase difference is given to a laser beam so as to correct the wavefront aberration. To the liquid crystal panel, the voltage corresponding to a direction and an amount of the aberration to be corrected is applied in reference to a predetermined bias voltage. Generally, the bias voltage is set at a substantially midpoint of a dynamic range of the phase difference obtained by the liquid crystal panel so that the aberration of both directions can be corrected.

At the time of using the liquid crystal panel for the aberration correction in the optical pickup having two or more wavelengths, when the same bias voltage is set to the laser beams having different wavelengths, the correction voltage applied to the liquid crystal panel for the aberration correction and the phase difference (i.e., a sensitivity of the phase difference) accordingly generated by the liquid crystal panel are sometimes different for each wavelength. Concretely, the sensitivity of the phase difference of the long wavelength becomes low, and the sensitivity of the phase difference of the short wavelength becomes high. The sensitivity of the phase difference indicates a rate of a variation of the phase difference in correspondence with a variation of the applied correction voltage. Therefore, between the optical discs using different wavelengths, since the correction voltages to be applied to the liquid crystal panels in order to correct the same disc tilt amount are greatly different, it is necessary to widely maintain the dynamic range of the control voltage. In addition, even if the dynamic range of the control voltage is widely maintained, since the resolution of the control becomes low in the wavelength having the high sensitivity of the phase difference, it is problematic that the control of the liquid crystal panel cannot be accurately executed.

Japanese Patent Application Laid-Open No. 2001-273663 discloses a method of switching the bias voltage applied to the liquid crystal element in an aberration correction apparatus using the liquid crystal element.

SUMMARY OF THE INVENTION

The above is an example of the problems to be solved by the present invention. An object of the present invention is to set an adequate bias voltage to the optical pickup having the liquid crystal panel for correcting the aberrations so as to effectively correct the aberrations in different wavelengths.

According to one aspect of the present invention, there is provided an aberration correction apparatus including: an optical pickup having a liquid crystal panel which gives a phase difference to a light beam emitted from a light source unit and irradiated onto a recording medium and corrects an aberration occurring to the light beam; and a control unit which applies, to the liquid crystal panel, a correction voltage corresponding to an amount of the aberration in reference to a bias voltage, wherein the bias voltage is set to each of the recording mediums so that the correction voltage applied for correcting an aberration of a same amount caused by a disc tilt becomes equal for different kinds of recording mediums.

The above aberration correction apparatus is preferably loaded on a drive apparatus for recording/reproducing information such as an optical disc, for example. As the optical disc, there are proposed a Blu-ray Disc (BD), a DVD, a CD and the like, for example. The optical pickup irradiates the light beam emitted from the light source, such as a laser light beam, onto the optical disc via an optical system, and includes the liquid crystal panel particularly for correcting the aberration such as an aberration caused by the optical disc tilt. By giving the bias voltage, a refractive index of the liquid crystal layer of the liquid crystal panel is varied, and as a result, the phase difference is given to the light beam passing through the liquid crystal panel. Therefore, by applying, to the liquid crystal panel, the appropriate voltage corresponding to the aberration amount in reference to the bias voltage, the aberration caused due to the disc tilt can be corrected.

The bias voltage is set to each of the recording mediums so that the correction voltage applied for correcting the aberration of the same amount caused by the disc tilt becomes equal for different kinds of recording mediums. Namely, even when the plural kinds of recording mediums are used, if the aberration amounts are same, the aberrations can be corrected by applying the same correction voltage. Therefore, if the bias voltage is set, by using the control circuit for applying the correction voltage, the correction can be performed with the same resolution irrespective of the kinds of recording mediums. On each recording medium, aberration correction accuracy can be improved.

In one form of the above aberration correction apparatus, a wavelength of the light beam may be different for each of the recording mediums, and the bias voltage set to the recording medium using a wavelength having a high sensitivity of the phase difference may be higher than the bias voltage set to the recording medium using a wavelength having a low sensitivity of the phase difference.

In this form, the bias voltage of the recording medium using the wavelength having the high sensitivity of the phase difference such as the BD is set higher than the bias voltage of the recording medium using the wavelength having the low sensitivity of the phase difference such as the DVD. Like this, if the bias voltage of the wavelength of the higher sensitivity of the phase difference is set high and the sensitivity of the phase difference thereof is unified to the low sensitivity of the phase difference, even when the recording medium is different, the aberration by the same disc tilt can be corrected with the same correction voltage. It is noted that the sensitivity of the phase difference is the rate of the variation of the phase difference generated by the liquid optical panel with respect to the variation of the voltage applied to the liquid crystal panel.

According to another aspect of the present invention, there is provided a control apparatus of an optical pickup having a liquid crystal panel which gives a phase difference to a light beam emitted from a light source unit and irradiated onto a recording medium and corrects an aberration occurring to the light beam, including: a control unit which applies, to the liquid crystal panel, a correction voltage according to an amount of the aberration in reference to a bias voltage, wherein the bias voltage is set to each of the recording mediums so that the correction voltage applied for correcting an aberration of a same amount caused by a disc tilt becomes equal for different kinds of recording mediums.

In accordance with a similar aspect of the present invention, there is provided a control method of an optical pickup having a liquid crystal panel which gives a phase difference to a light beam emitted from a light source unit and irradiated onto a recording medium and corrects an aberration occurring to the light beam, including: a process which applies, to the liquid crystal panel, a correction voltage corresponding to an amount of the aberration in reference to a bias voltage, wherein the bias voltage is set to each of the recording mediums so that the correction voltage applied for correcting an aberration of a same amount caused by a disc tilt becomes equal for different kinds of recording mediums.

In accordance with a similar aspect of the present invention, there is provided a control program of an optical pickup having a liquid crystal panel which gives a phase difference to a light beam emitted from a light source unit and irradiated onto a recording medium and corrects an aberration occurring to the light beam, executed by a computer loaded on a control apparatus of the optical pickup, and making the computer function as a control unit which applies, to the liquid crystal panel, a correction voltage corresponding to an amount of the aberration in reference to a bias voltage, wherein the bias voltage is set to each of the recording mediums so that the correction voltage applied for correcting an aberration of a same amount caused by a disc tilt becomes equal for different kinds of recording mediums.

According to the control apparatus, the control method and the control program of the optical pickup, even when the plural kinds of recording mediums are used, if the disc tilt angles thereof are same, the aberration can be corrected by applying the same correction voltage. Therefore, if the bias voltage is set, by using the control circuit for applying the correction voltage, the control can be executed with the same resolution irrespective of the kinds of recording mediums. For each of the recording mediums, the aberration correction accuracy can be improved.

According to still another aspect of the present invention, there is provided an aberration correction apparatus including: an optical pickup having a liquid crystal panel which gives a phase difference to a light beam emitted from a light source unit and irradiated onto a recording medium and corrects an aberration occurring to the light beam; and a control unit which applies, to the liquid crystal panel, a correction voltage corresponding to an amount of the aberration in reference to a bias voltage, wherein the bias voltage is set to each of the recording mediums so that the correction voltage applied for generating an aberration of a same amount becomes equal for different kinds of recording mediums.

The above aberration correction apparatus is preferably loaded on the drive apparatus for recording/reproducing the information such as the optical disc. As the optical disc, there are proposed the Blu-ray Disc (BD), the DVD, the CD and the like, for example. The optical pickup irradiates the light beam emitted from the light source, such as the laser light, onto the optical disc via the optical system, and includes the liquid crystal panel particularly for correcting the aberration caused due to the optical disc tilt. By giving the bias voltage, the refractive index of the liquid crystal layer of the liquid crystal panel is varied, and as a result, the phase difference is given to the light beam passing through the liquid crystal panel. Therefore, by applying, to the liquid crystal panel, the appropriate voltage corresponding to the aberration amount in reference to the bias voltage, the aberration caused due to the disc tilt and the like can be corrected.

The bias voltage is set to each of the recording mediums so that the correction voltage applied for generating the aberration of the same amount becomes equal for the different kinds of recording mediums. Namely, even when the plural kinds of recording mediums are used, the aberration of the same amount can be generated at the time of giving them the same applied voltage. Thus, since the magnitude variation of the reproduction signal can be the same between the different recording mediums and the relation between the applied voltage and the reproduction signal magnitude becomes the same, there occurs no difference of estimation of an optimum applied voltage between the recording mediums.

In one form of the above aberration correction apparatus, a wavelength of the light beam may be different for each of the recording mediums, and the bias voltage set to the recording medium using a wavelength having a high sensitivity of the aberration may be higher than the bias voltage set to the recording medium using a wavelength having a low sensitivity of the aberration.

In this mode, the bias voltage of the recording medium using the wavelength having the high sensitivity of the aberration such as the BD is set higher than the bias voltage of the recording medium using the wavelength having the low sensitivity of the aberration such as the DVD. In such the method, by setting the bias voltage of the wavelength of the higher sensitivity of the aberration higher to be unified to the low sensitivity of the aberration, even when the recording medium is different, it becomes possible to generate the aberration of the same amount with the same correction voltage. It is noted that the sensitivity of the aberration is the rate of the variation of the aberration generated by the liquid crystal panel with respect to the variation of the voltage applied to the liquid crystal panel.

The aberration correction apparatus may further include: a unit which applies an applied voltage of a predetermined number based on the bias voltage set to each of the recording mediums at each predetermined radius position of the recording medium and obtains reproduction signal magnitude values of the predetermined number; a unit which obtains a relation between the reproduction signal magnitude value and the applied voltage by an approximation operation using the reproduction signal magnitude value for each radius position and produces a disc tilt angle profile of the recording medium; and a correction unit which corrects an aberration caused by the disc tilt based on the produced disc tilt angle profile. In this form, even if the recording medium is different, since the aberration of the same amount can be generated with the same correction voltage, it becomes possible to produce the accurate disc tilt angle profile.

In a preferred embodiment of the above aberration correction apparatus, the light source unit may emit plural light beams having different wavelengths, and the bias voltage may be different for each wavelength of the light beam. In addition, the control unit may include: a storage unit which stores the bias voltage; a correction voltage determining unit which determines the correction voltage; and a correction voltage applying unit which applies the correction voltage to the liquid crystal panel. According to still another aspect of the present invention, there is provided a control apparatus of an optical pickup having a liquid crystal panel which gives a phase difference to a light beam emitted from a light source unit and irradiated onto a recording medium and corrects an aberration occurring to the light beam, including: a control unit which applies, to the liquid crystal panel, a correction voltage corresponding to an amount of the aberration in reference to a bias voltage, wherein the bias voltage is set to each of the recording mediums so that the correction voltage applied for generating an aberration of a same amount becomes equal for different kinds of recording mediums.

According to similar aspect of the present invention, there is provided a control method of an optical pickup having a liquid crystal panel which gives a phase difference to a light beam emitted from a light source unit and irradiated onto a recording medium and corrects an aberration occurring to the light beam, including: a process which applies, to the liquid crystal panel, a correction voltage corresponding to an amount of the aberration in reference to a bias voltage, wherein the bias voltage is set to each of the recording mediums so that the correction voltage applied for generating an aberration of a same amount becomes equal for different kinds of recording mediums.

According to a similar aspect of the present invention, there is provided a control program of an optical pickup having a liquid crystal panel which gives a phase difference to a light beam emitted from a light source unit and irradiated onto a recording medium and corrects an aberration occurring to the light beam, executed by a computer loaded on a control apparatus of the optical pickup, making the computer function as a control unit which applies, to the liquid crystal panel, a correction voltage corresponding to an amount of the aberration in reference to a bias voltage, wherein the bias voltage is set to each of the recording mediums so that the correction voltage applied for generating an aberration of a same amount becomes equal for different kinds of recording mediums.

According to the control apparatus, the control method and the control program of the optical pickup, even when the plural kinds of recording mediums are used, the aberration of the same amount can be generated at the time of giving them the same applied voltage. Therefore, the magnitude variation of the reproduction signal can be same between the different recording mediums, and the relation between the applied voltage and the reproduction signal magnitude becomes the same. Thus, there occurs no difference of the estimation of the optimum applied voltage between the recording mediums.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

Figure 1A:
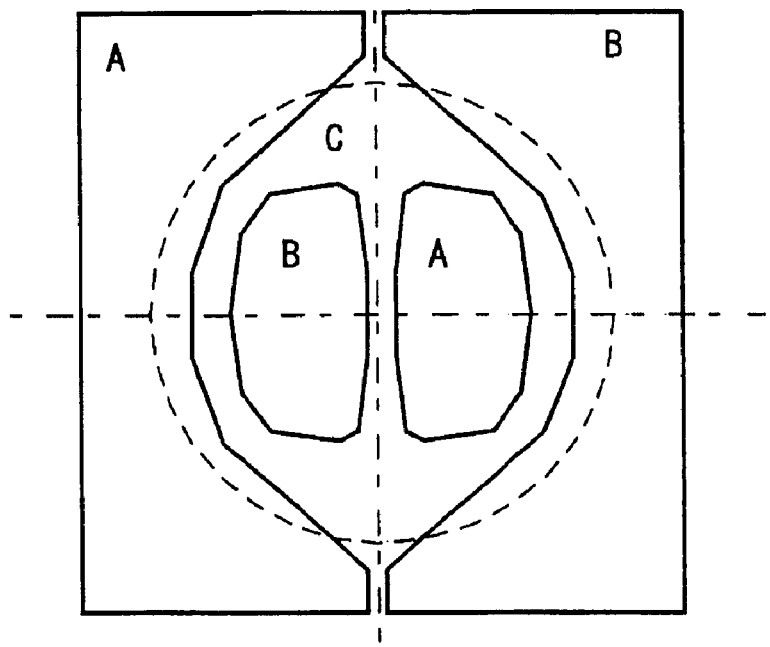
FIG. 1A is a plan view showing an electrode pattern example of a liquid crystal panel for aberration correction.

Hereunder, preferred embodiments of the present invention will be described by referring to the drawings.

[Aberration Correction Principle]

First, a description will be given as to a principle of coma aberration correction (tilt correction) using the liquid crystal panel. FIG. 1A shows an example of an electrode pattern on the liquid crystal panel. The liquid crystal panel has the electrodes formed thereon in a pattern corresponding to coma aberration distribution generated by a disc tilt. This electrode pattern can be divided into an area having a positive phase difference from a reference wavefront, an area having a negative phase difference from the reference wavefront and an area having no phase difference from the reference wavefront.

The liquid crystal panel has a property of changing its refractive index according to the voltage applied to a transparent electrode. Therefore, by controlling the applied voltage, it is possible to give an optical path length difference (phase difference) to the light beams transmitted through the liquid crystal layer in different electrode areas. This property is used to have the liquid crystal panel generate the phase difference for canceling a coma aberration generated by the disc tilt. As the coma aberration generated by the disc tilt has a bipolar phase difference which is positive and negative with respect to the reference wavefront, it is necessary to generate positive and negative phase differences by the liquid crystal panel in order to cancel this aberration. For that reason, it is necessary to give the phase difference uniformly becoming the bias (hereafter, also referred to as a "bias phase difference") to the light beam transmitted through the liquid crystal panel and also generate the positive and negative phase differences in reference to the bias phase difference. Therefore, the bias voltage is applied to the liquid crystal panel in order to generate the bias phase difference, and correction voltages are applied in order to generate the positive and negative phase differences, respectively. It is noted that the phase difference generated by the liquid crystal panel is given by a product of a refractive index "n" of the liquid crystal and a thickness "d" of the liquid crystal layer.

Figure 1B:
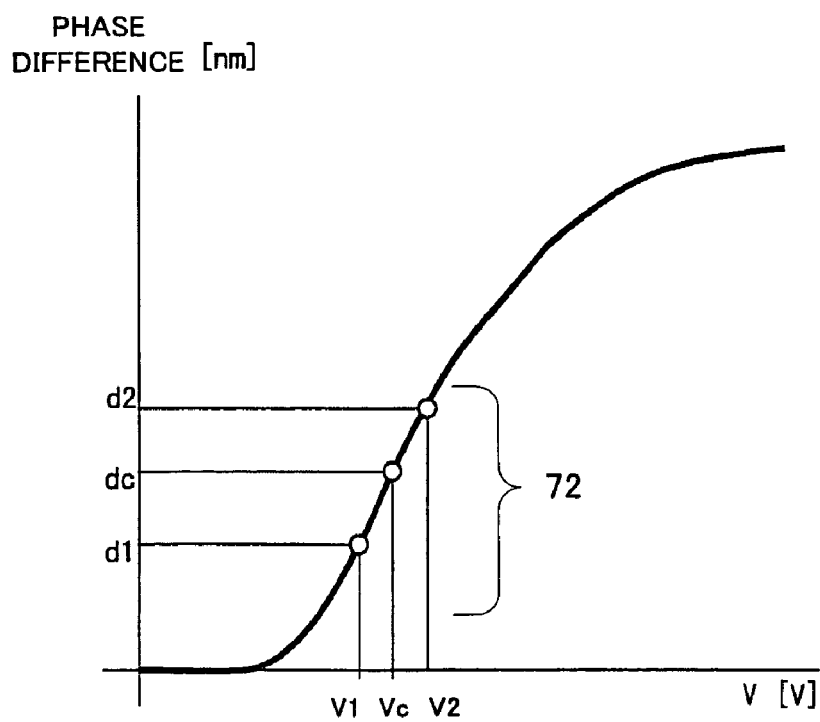
FIG. 1B is a graph showing a relation between an applied voltage to the liquid crystal panel and a generated phase difference.

Specifically, to a liquid crystal panel 70 having the electrode pattern exemplified in FIG. 1A, a bias voltage Vc for generating a bias phase difference dc is applied to an electrode C. As shown in FIG. 1B, a voltage V1 lower than the bias voltage Vc is applied to an electrode A in reference to the bias voltage Vc so as to generate a phase difference smaller than the bias phase difference dc, that is, a negative phase difference d1 with respect to the bias phase difference dc. A voltage V2 higher than the bias voltage Vc is applied to an electrode B so as to generate a phase difference larger than the bias phase difference dc, that is, a positive phase difference d2 with respect to the bias phase difference dc. Thus, it is possible to generate the positive and negative phase differences with respect to the bias phase difference dc. In the case where an inclination property of the disc tilt is reverse, the relation of the voltages V1 and V2 with respect to the bias voltage Vc should be reversed.

Figure 2A:
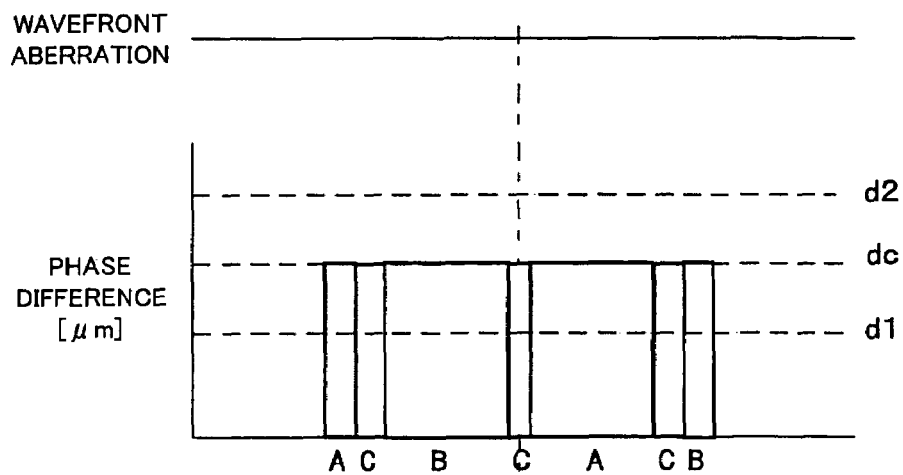
FIGS. 2A to 2C show control examples of the liquid crystal panel according to a disc tilt amount.
Figure 2B:
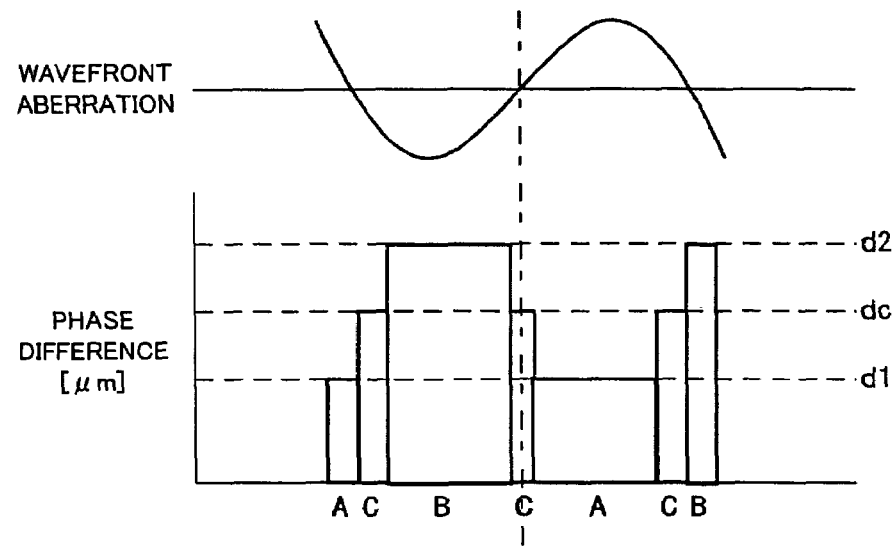
Figure 2C:
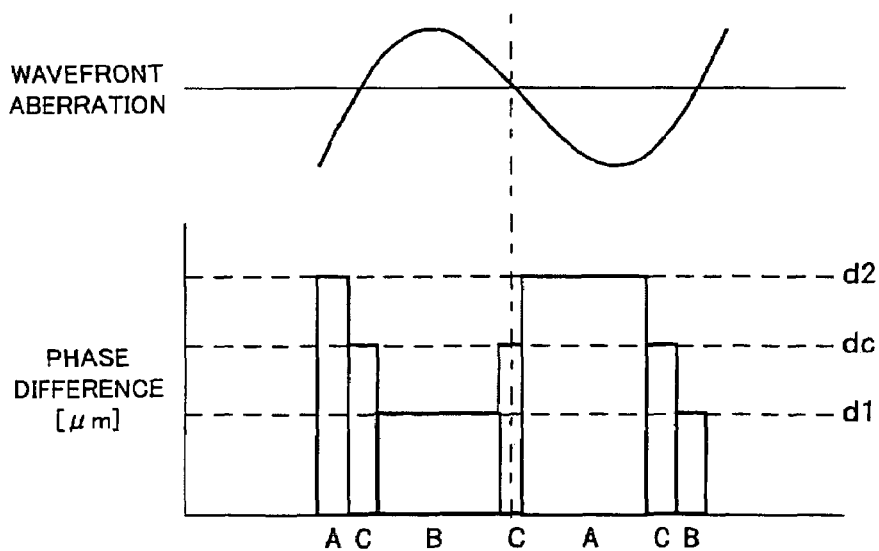

FIGS. 2A to 2C show relations between a disc tilt state and a phase difference generated by the liquid crystal panel in order to correct the wavefront aberration generated by the disc tilt.

FIG. 2A shows an example of the case that no disc tilt is present, wherein no wavefront aberration is generated. Therefore, the bias voltage Vc is applied to all the electrodes of the liquid crystal panel 70, and the uniform bias phase difference dc is generated in the entire area of the liquid crystal panel 70.

FIG. 2B shows an example of the case that the disc tilt is generated on a positive (+) side, wherein the wavefront aberration is positive in the area on the right side of the liquid crystal panel 70 and negative in the area on the left side thereof. As for the liquid crystal panel 70, the bias voltage Vc is applied to an electrode C to generate the bias phase difference dc. The voltage V1 is applied to the electrode A and the negative phase difference d1 with respect to the bias phase difference dc is generated so that the wavefront aberration is thereby canceled. The voltage V2 is applied to the electrode B and the positive phase difference d2 with respect to the bias phase difference dc is generated so that the wavefront aberration is thereby canceled. Consequently, the light beam having passed through the liquid crystal panel 70 is supplied to an objective lens in a state in which the wavefront aberration caused by the disc tilt is corrected.

FIG. 2C shows an example of the case that the disc tilt is generated on a negative (−) side, wherein the wavefront aberration is negative in the area on the right side of the liquid crystal panel 70 and positive in the area on the left side thereof. As for the liquid crystal panel 70, the bias voltage Vc is applied to the electrode C so as to generate the bias phase difference dc. The voltage V2 is applied to the electrode A and the positive phase difference d2 with respect to the bias phase difference dc is generated so that the wavefront aberration is thereby canceled. The voltage V1 is applied to the electrode B and the negative phase difference d1 with respect to the bias phase difference dc is generated so that the wavefront aberration is thereby canceled. Consequently, the light beam having passed through the liquid crystal panel 70 is supplied to the objective lens in the state in which the wavefront aberration caused by the disc tilt is corrected.

[Sensitivity Differences in BD and DVD]

Figure 3A:
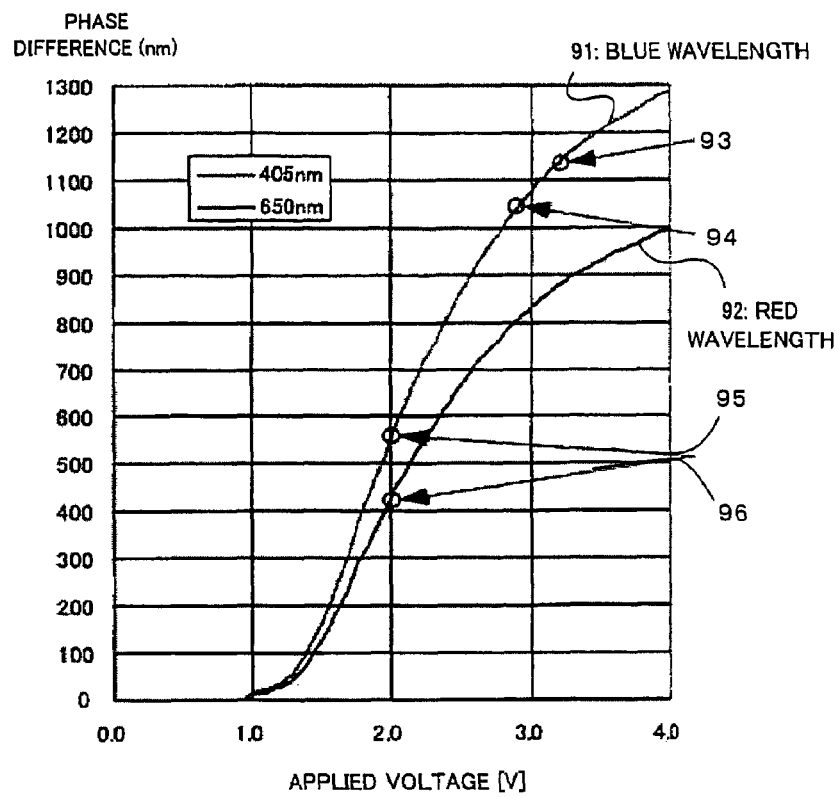
FIGS. 3A and 3B are graphs showing a relation between a bias voltage to the liquid crystal panel and a phase difference and a relation between an angle of a disc tilt and a wavefront aberration, as for a BD and a DVD.

Next, the description will be given of various kinds of sensitivity differences in the BD (Blu-ray Disc) and the DVD. FIG. 3A shows voltage-phase characteristics of the liquid crystal panel in a BD wavelength 405 nm (hereinafter also referred to as "blue wavelength") and a DVD wavelength 650 nm (hereinafter also referred to as "red wavelength"). In the liquid crystal panel, since the refractive indexes of the liquid crystal itself with respect to the blue wavelength and the red wavelength are different, the phase differences generated by the applied voltage are different. Therefore, the rate of the variation amount of the phase difference of the red wavelength in correspondence to the applied voltage becomes lower. The rate is referred to as the sensitivity of the phase difference.

Figure 4A:
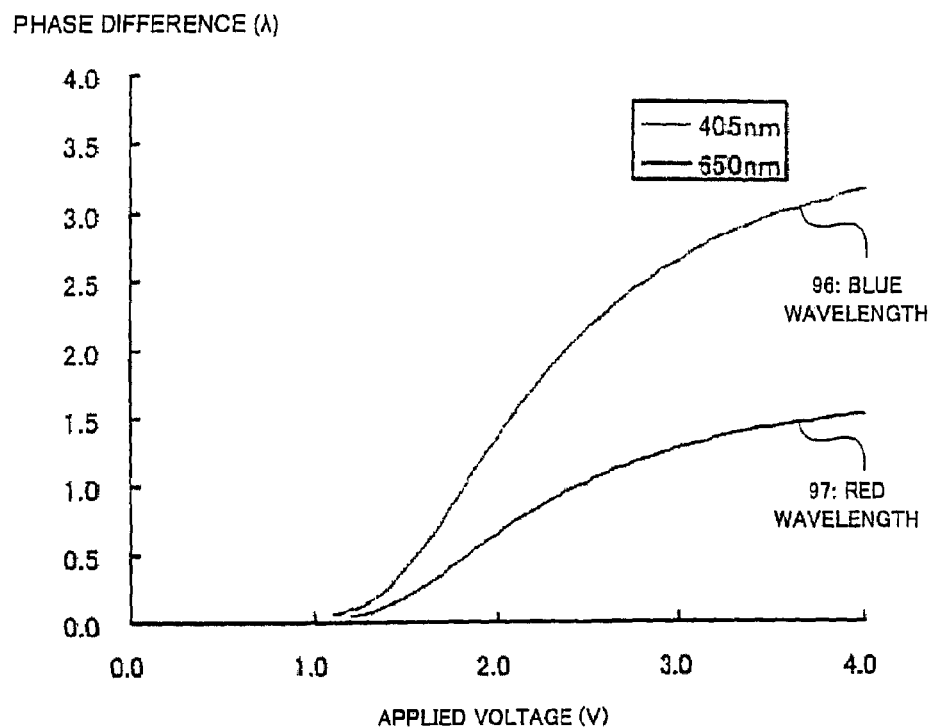
FIGS. 4A and 4B are graphs showing a relation between an applied voltage to the liquid crystal panel and the phase difference and a relation between the bias voltage and a sensitivity of the phase difference, as for the BD and the DVD.
Figure 4B:
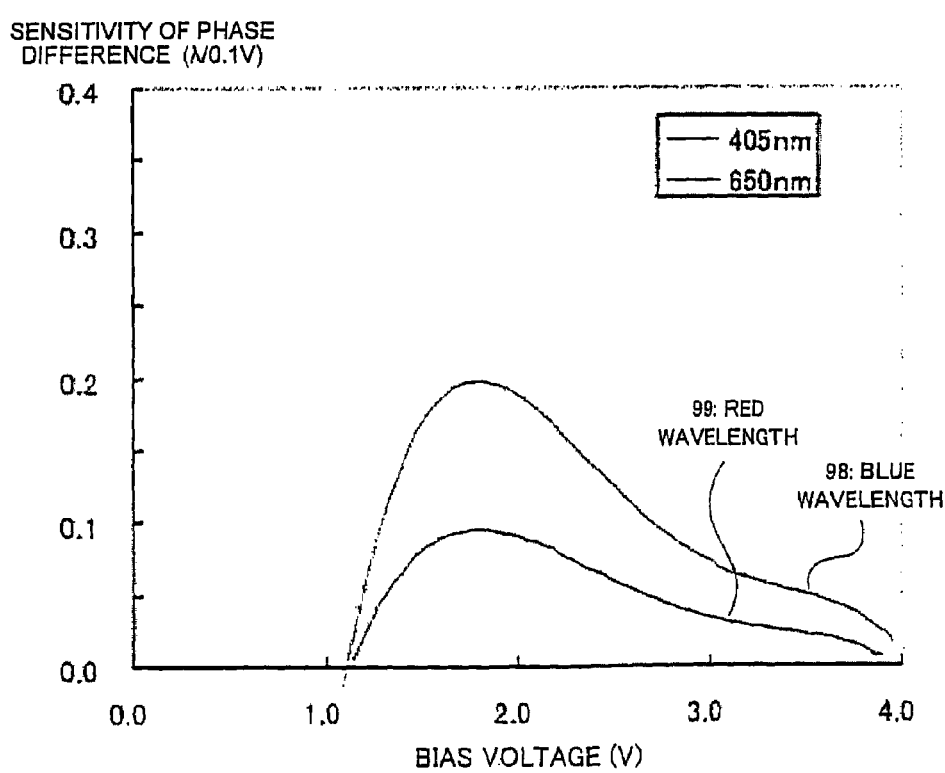

FIG. 4A shows a graph of the applied voltage and the phase difference in a case that the phase difference is normalized by the wavelength. When the phase difference is normalized by the wavelength, the sensitivity of the phase difference of the red wavelength having the longer wavelength becomes much lower. FIG. 4B shows the characteristic of the sensitivity of the phase difference obtained by differentiating the characteristic of the phase difference shown in FIG. 4A. The dynamic range of the phase difference of the red wavelength also becomes low, and in the case that the phase difference is normalized by the wavelength, the dynamic range of the red wavelength approximately becomes half of the dynamic range of the blue wavelength as shown in FIG. 4A. Like this, it is understood that even when the same applied voltage is given to the liquid panel, the generated phase differences are different dependently on the wavelengths.

Figure 3B:
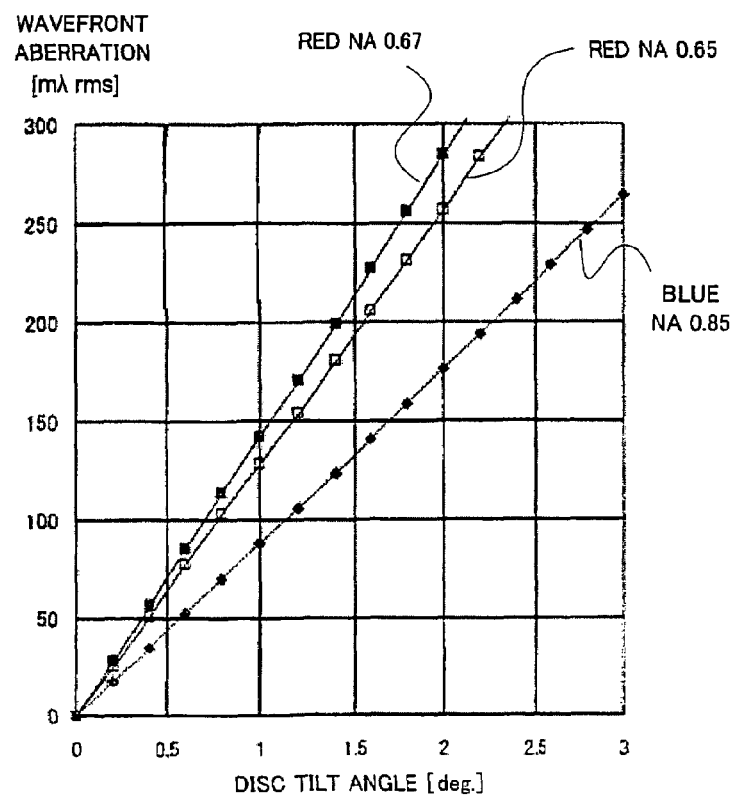

Next, the description will be given of a relation between the disc tilt and the aberration generated by the disc tilt. FIG. 3B is a graph showing relations between the disc tilt angles of the BD and the DVD and wavefront aberration (coma aberration) amounts generated by them. In the graphs shown in FIG. 3B, the wavefront aberration shown on the vertical axis is normalized by the wavelength.

Figure 5A:
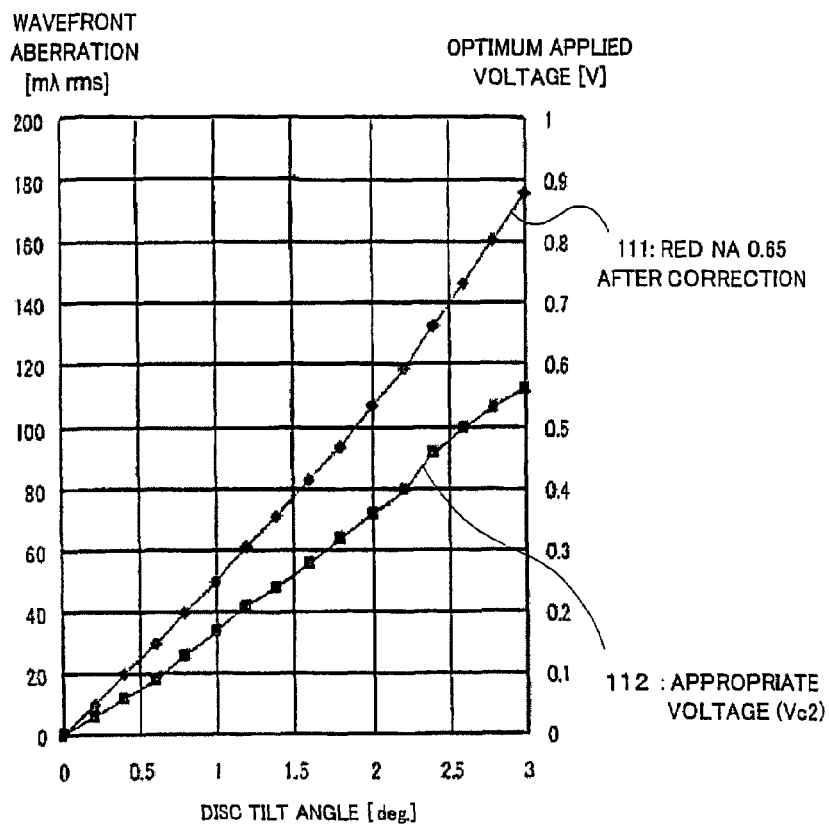
FIGS. 5A and 5B are graphs showing a relation between a disc tilt angle and a wavefront aberration, as for the BD and the DVD.

Recently, since a numerical aperture (NA) becomes large with the increase of recording speed of a recording-type DVD, the amount of coma aberration generated by the disc tilt becomes larger. As for the BD, since the NA is large, the generated aberration tends to become large. However, since the thickness of a cover layer of the BD disc is actually small, the aberration does not become so large as shown in FIG. 3B. On the contrary, as for the DVD, though the NA is smaller than the BD, the thickness of the cover layer of the disc is large. As a result, the aberration becomes large as shown in FIG. 5A. Like this, it is understood that even with the same disc tilt angle, the generated wavefront aberration of the DVD is larger than that of the BD, and the aberration amount to be corrected of the DVD is large.

Totally considering the above-mentioned study, since the sensitivity of the phase difference of the DVD is lower than that of the BD, the applied voltage larger than the BD is necessary to generate the same phase difference in the DVD. In addition, since the rate of the wavefront aberration of the DVD, generated by the disc tilt, is larger than that of the BD, it is understood that even with the same disc tilt angle, the aberration to be corrected of the DVD becomes larger in comparison with the BD.

First Embodiment

Based on the above-mentioned study of the sensitivity difference, in a first embodiment, the bias voltage for each wavelength is set so that the aberration amounts caused by the same disc tilt of discs using different wavelengths, such as the BD and the DVD, can be corrected by the same correction voltage.

Figure 5B:
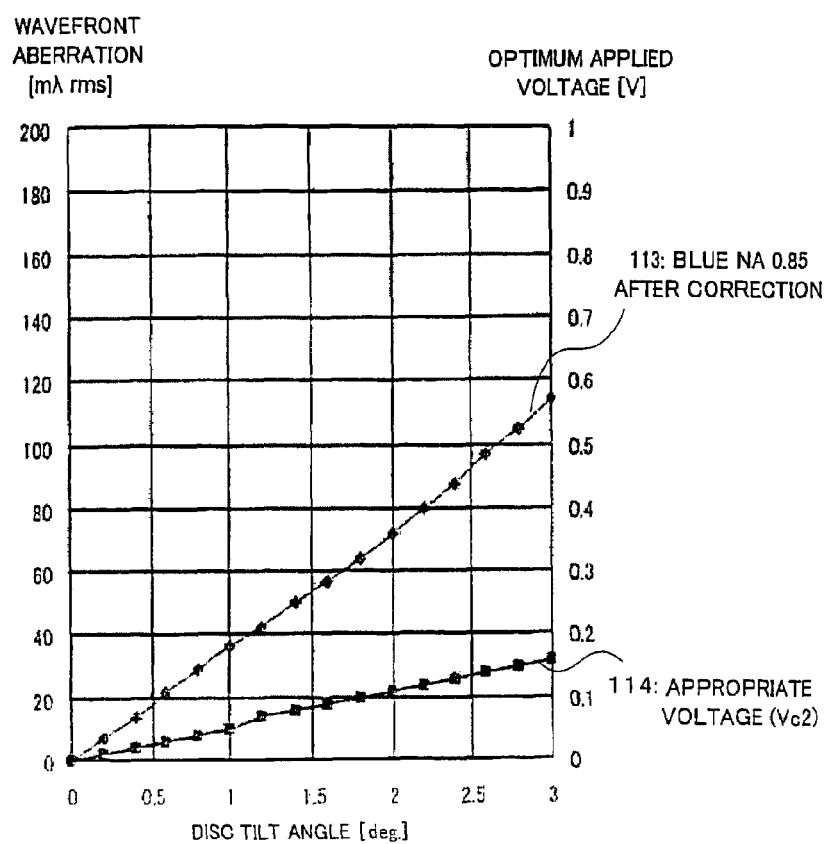

FIGS. 5A and 5B show relations of the wavefront aberration and the optimum applied voltage with respect to the disc tilt angle in a case that the bias voltage Vc is set to 2.0V in the DVD and the BD, respectively. The phase differences of the blue wavelength and the red wavelength at this time are indicated by the points 95 and 96 in FIG. 3A, respectively. The optimum applied voltage shows the correction voltage to be applied for correcting the wavefront aberration amount at this time. In addition, it is assumed that the electrode pattern of the liquid crystal panel for the aberration correction in the BD and the DVD are similarly optimized.

In FIG. 5A, a graph 111 shows the wavefront aberration, and a graph 112 shows the optimum applied voltage. In FIG. 5B, a graph 113 shows the wavefront aberration, and a graph 114 shows the optimum applied voltage. In FIGS. 5A and 5B, a case that the disc tilt angle is 1 degree is focused on, for example. As shown in FIG. 5A, the wavefront aberration of the DVD is approximately 50 m$\lambda$ according to the graph 111, and the optimum applied voltage is approximately 0.18V according to the graph 112. On the contrary, as shown in FIG. 5B, the wavefront aberration of the BD is approximately 36 m$\lambda$ according to the graph 113, and the optimum applied voltage is approximately 0.05V according to the graph 114. Namely, the correction voltage to be applied for correcting the aberration caused by the one-degree disc tilt of the DVD is 0.18V. On the contrary, the correction voltage to be applied for correcting the aberration caused by the one-degree disc tilt of the BD is 0.05V. Namely, they are different. In this example, the correction voltage to be applied for correcting the aberration caused by the same one-degree disc tilt, of the DVD, is approximately 3.5 times as large as the correction voltage of the BD. Like this, if the correction voltage to be applied for correcting the aberration caused by the same disc tilt is different for each disc, it is problematically necessary that the dynamic range of the correction voltage is widely maintained as described above.

Therefore, in this embodiment, by setting the bias voltage for each disc to the optimum value, it is realized that the aberration caused by the same disc tilt of the different discs can be corrected with the same correction voltage. Concretely, the bias voltages of the BD and the DVD may be set respectively so that the graph 112 of the optimum applied voltage for the DVD, shown in FIG. 5A, and the graph 114 of the optimum applied voltage for the BD, shown in FIG. 5B, become almost the same.

Figure 6:
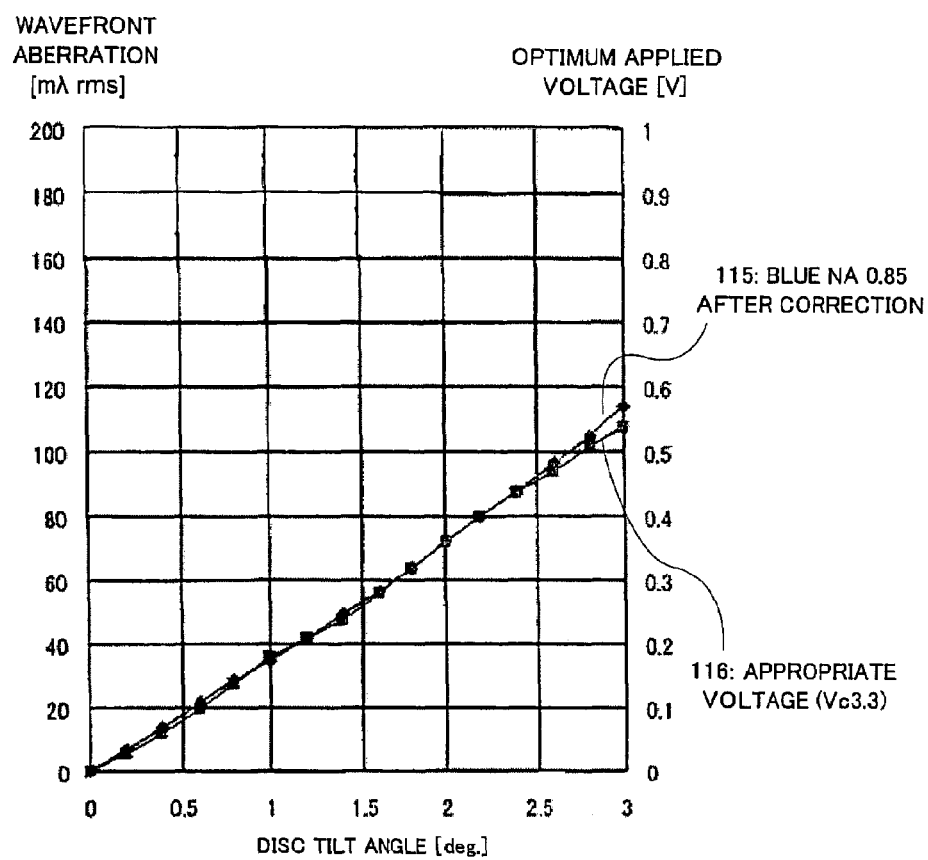
FIG. 6 is a graph showing the relation between the disc tilt angle and the wavefront aberration, as for the BD.

FIG. 6 shows an example thereof. FIG. 6 shows the relations of the wavefront aberration and the optimum applied voltage with respect to the disc tilt angle in a case that the bias voltage Vc of the BD is set to 3.3V. It is noted that the phase difference of the blue wavelength at this time is shown at a point 93 in FIG. 3A. A graph 115 shows the wavefront aberration, and a graph 116 shows the optimum applied voltage. When the bias voltage Vc is set to 3.3V like this, the graph 116 showing the optimum applied voltage substantially coincides with the graph 112 shown in FIG. 5A, i.e., the graph of the optimum applied voltage in a case that the bias voltage Vc of the DVD is set to 2.0V. Thus, in this example, by setting the bias voltages Vc of the DVD (red wavelength) and the BD (blue wavelength) to 2.0V and 3.3V, respectively, the aberration caused by the disc tilt of the same amount, generated in the DVD and the BD, can be corrected with the same correction voltage.

Next, the description will be given of a method of leading such the bias voltage.

FIG. 4B shows the sensitivity of the phase differences in the blue wavelength and the red wavelength. Now, the sensitivities of the phase difference in the blue wavelength and the red wavelength are defined as follows.

Phase difference sensitivity in blue wavelength:

$$\Delta Pb1 = f(Vbb1)$$

Phase difference sensitivity in red wavelength:

$$\Delta Pred = f(Vbred) \quad (1)$$

At this time, by setting the bias voltages Vbb1 and Vbred satisfying:

$$\Delta Pb1 = \Delta Pred \quad (2),$$

the sensitivities of the phase difference of the BD and the DVD can be unified.

On the other hand, the aberration coefficient of the coma aberration caused by the disc tilt is expressed by an equation below.

$$W = -d/2 \cdot \{(n^2-1)\sin\theta \cos\theta/(n^2-\sin^2\theta)^{5/2}\}(NA)^3 \quad (3)$$

By substituting the following conditions for the equation (3),
 DVD: NA=0.65, disc thickness d=0.6, disc refractive index n=1.59
 BD: NA=0.85, disc thickness d=0.1, disc refractive index n=1.59 and further normalizing the value by the wavelength (BD: 650 nm and DVD: 405 nm), the coma aberration amount generated by the same disc tilt $\theta$ becomes:

$$\text{(coma aberration of DVD)/(coma aberration of BD)} = \text{approximately } 1.65 \quad (4)$$

Therefore, when the disc tilt angles of the BD and the DVD are the same, the coma aberration of the DVD approximately becomes 1.65 times as large as the coma aberration of the BD.

According to the above description, the bias voltage capable of correcting the aberration caused by the same disc tilt with the same correction voltage is examined. When the same disc tilt angles exist, according to the equation (4), the coma aberration of the DVD is approximately 1.65 times as large as the coma aberration of the BD. On the contrary, as shown in FIG. 4B, the sensitivity of the phase difference of the DVD is approximately a half of the sensitivity of the phase difference of the BD, and it is equivalent to the situation that the sensitivity of the red wavelength further decreased to $1/1.65$ in accordance with the equation (4). Therefore, in order to correct the aberrations caused by the same disc tilt of the BD and the DVD with the same correction voltage, the bias voltages Vbb1 and Vbred may be set so that:

$$\Delta Pb1 = \Delta Pred/1.65 \quad (5)$$

That is, as for the BD, by setting the bias voltage Vbb1 in a high bias area (see FIG. 4B) in which the sensitivity of the phase difference of the blue wavelength decreases, the aberrations caused by the same disc tilt can be corrected with the same correction voltage.

In the above-mentioned example, the bias voltage Vbred of DVD=2.0V, and the bias voltage Vbb1 of BD=3.3V. With reference to the characteristic of the sensitivity of the phase difference in FIG. 4B, when the bias voltage Vbred=2.0V, the phase difference sensitivity $\Delta$Pbred of the red wavelength is approximately 0.9. In addition, when the bias voltage Vbb1 =3.3V, the phase difference sensitivity $\Delta$Pbb1 of the blue wavelength is approximately 0.55. Therefore, the above equation (5) is satisfied.

According to the above description, in order to set the bias voltage for correcting the aberrations caused by the same disc tilt with the same correction voltage, based on the equation (5), the respective bias voltages Vbb1 and Vbred, making the phase difference sensitivity ΔPbred of the red wavelength correspond to approximately 1.65 times of the phase difference sensitivity ΔPbb1 of the blue wavelength, may be determined with reference to the characteristic of the sensitivity of the phase difference.

Like this, in the first embodiment, it becomes possible that the aberrations caused by the same disc tilt in the BD and the DVD are corrected with the same correction voltage. Like the related art, if the correction voltage (control voltage) for correcting the aberration caused by the same disc tilt is different for each disc, the control resolution of the BD decreases to approximately one third, and the aberration correction accuracy of the BD decreases. On the contrary, in this embodiment, since the aberration caused by the same disc tilt can be corrected with the same correction voltage, the control resolutions of the BD and the DVD can be identical, and the aberration correction accuracy can be maintained in both of the DVD and the BD. In addition, in a case that a tilt sensor and the like are included and the disc tilt angle is detectable, servo gains of the DVD and the BD can be unified.

Figure 7:
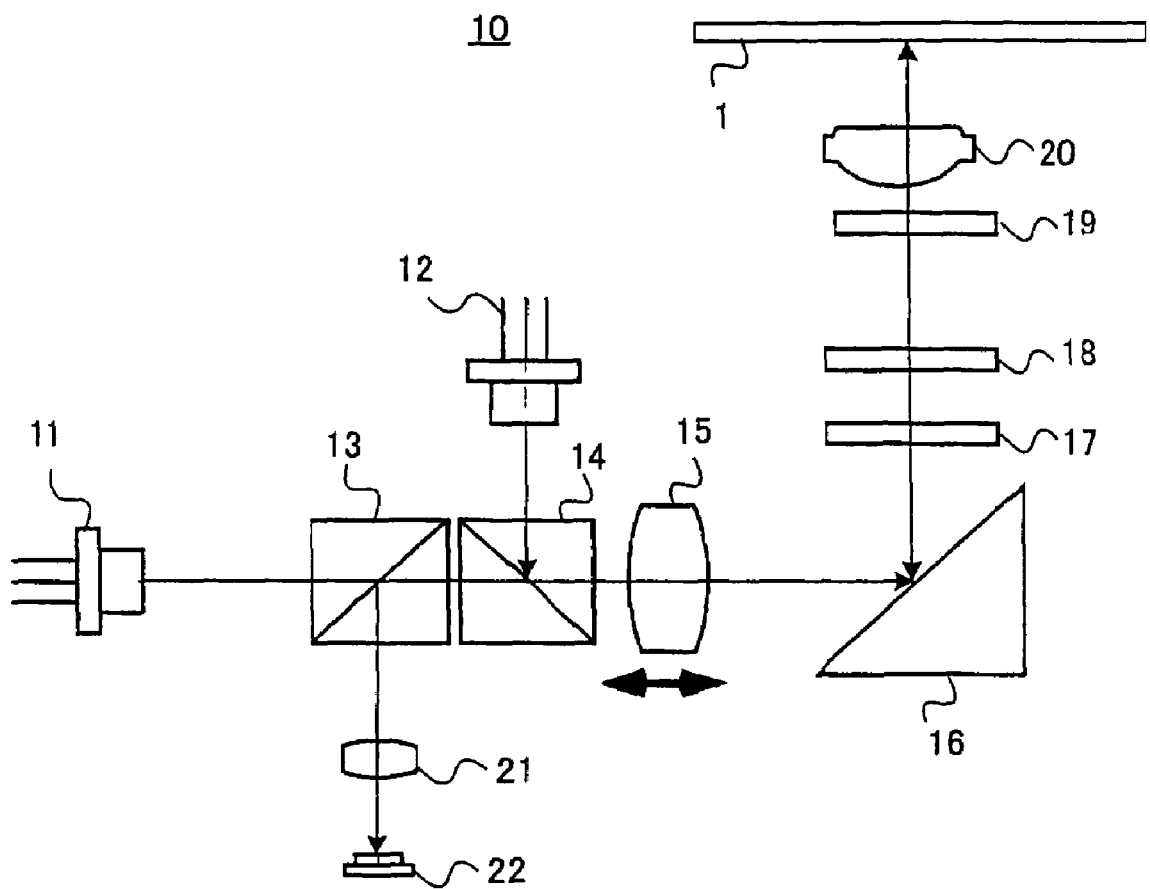
FIG. 7 is a block diagram schematically showing a configuration of an optical pickup according to the embodiment of the present invention.

FIG. 7 schematically shows the configuration of the optical pickup according to the first embodiment. In FIG. 7, an optical pickup 10 is adapted to the three wavelengths, capable of irradiating the laser beams for the BD, DVD and CD on the optical disc. As the light sources, the optical pickup 10 includes a blue LD (laser diode) 11 for emitting the laser beam for the BD and a two-wavelengths LD 12 of red and infrared for emitting the laser beams for the DVD and CD.

The laser beam of 405 nm emitted from the blue LD 11 passes through a polarizing beam splitter (PBS) 13 and a dichroic/PBS prism 14, is changed to parallel light by a collimator lens 15 and is directed upward by a mirror 16. The laser beam is irradiated on a recording surface of a disc 1 by an objective lens 20 after passing through a liquid crystal panel 17 for aberration correction, a ¼ wavelength plate 18 adapted to the three wavelengths and a compatibility element 19. The liquid crystal panel 17 is the above-mentioned liquid crystal panel for aberration correction, which gives adequate phase differences to the laser beams based on the bias voltage and correction voltage applied from the outside. The ¼ wavelength plate 18 converts the laser beams supplied from the liquid crystal panel 17 from linear polarization to circular polarization. The compatibility element 19 adjusts an aperture ratio and corrects the aberrations according to differences in wavelength among the laser beams for the BD, DVD and CD and differences in thickness among the discs of the BD, DVD and CD. The compatibility element 19 is comprised of a holographic lens, for instance.

The laser beam for the DVD or CD emitted from the two-wavelength LD 12 is reflected by the dichroic/PBS prism 14 in the direction of the collimator lens 15, and is then irradiated on the optical disc 1 via the same path as the laser beam for the BD.

The laser beam reflected by the optical disc 1 passes through the compatibility element 19, the ¼ wavelength plate 18 and the liquid crystal panel 17, and has its direction changed by the mirror 16. It is then transmitted through the collimator lens 15 and dichroic/PBS prism 14, and has its direction changed by the PBS 13 so as to be focused on a detector 22 via a condenser lens 21. The beam irradiated on the detector 22 is photoelectrically converted to an electrical signal from which a reproduction signal and a servo error signal are then generated.

According to the above embodiment, the two-wavelength LD is used to generate the laser beams for the DVD and CD. However, application of the present invention is not limited to this. Namely, it is sufficient that the laser beams for the BD, DVD and CD are generated by the configuration before the collimator lens 15 and are switched to be irradiated on the optical disc 1.

Figure 8:
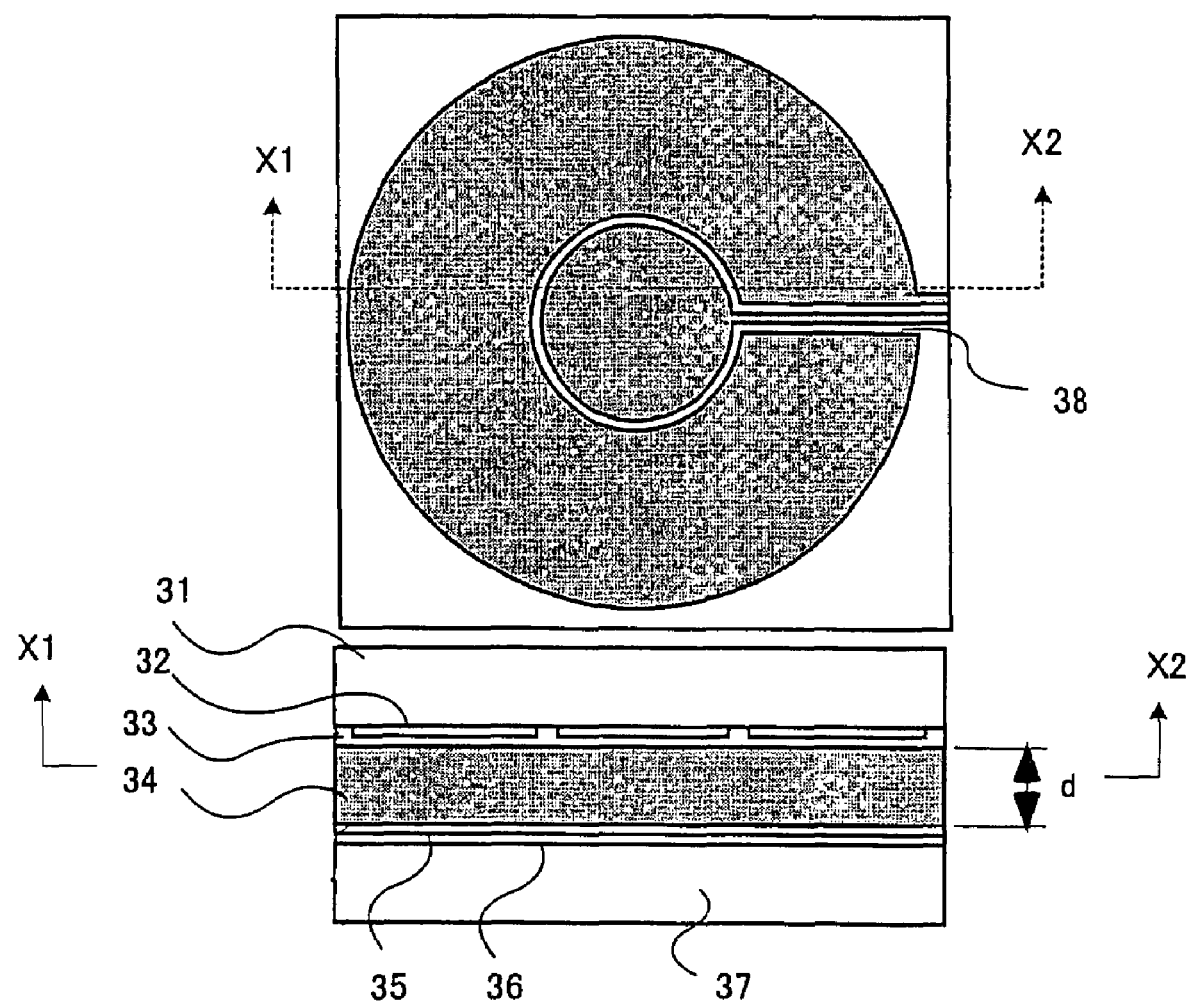
FIG. 8 shows a plan view and a sectional view showing the configuration of the liquid crystal panel for aberrations correction.

Next, the configuration of the liquid crystal panel 17 will be described. FIG. 8 shows a configuration example of the liquid crystal panel 17. In this example, an electrode 32 is comprised of an approximately circular electrode at the center and an annular electrode on its outer circumference, and a gap 38 configuring an electrode gap is formed between these electrodes. The form of the electrode 32 is decided according to a distribution pattern of the aberrations to be corrected as previously described, and FIG. 8 shows an example different from the electrode pattern of the liquid crystal panel for the aberration correction shown in FIG. 1A.

FIG. 8 shows a plan view of the liquid crystal panel 17 and a sectional view at a section line X1 to X2 thereof. As shown in the sectional view, the liquid crystal panel 17 is configured by sandwiching a liquid crystal layer 34 between a pair of transparent glass substrates 31 and 37. On an undersurface of the upper glass substrate 31, an upper electrode 32 in a concentric pattern shown in the plan view is formed with ITO (Indium Tin Oxide) and so on. On an upper surface of the lower glass substrate 37, a lower electrode 36 of the ITO is also formed on the entire surface thereof or in the same pattern as the upper electrode 32. On the undersurface of the upper electrode 32 and on the upper surface of the lower electrode 36, orientation films 33 and 35 for controlling orientation of liquid crystal molecules in the liquid crystal layer 34 are formed, respectively.

In this configuration, the orientation of the liquid crystal molecules in the liquid crystal layer 34 is controlled by applying the aforementioned bias voltage Vc and correction voltage between the upper electrode 32 and the lower electrode 36, and the refractive index is changed. The phase difference is thereby given to the laser beams passing through the liquid crystal panel 17 as previously described.

Figure 9:
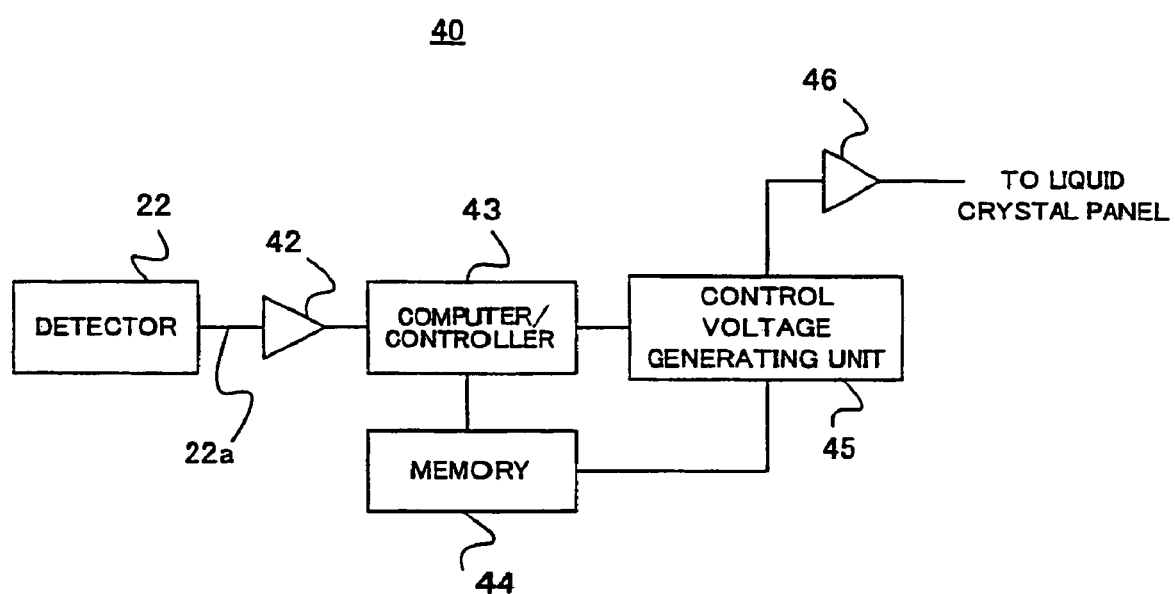
FIG. 9 is a block diagram showing the configuration of a control unit of the optical pickup.

FIG. 9 shows the configuration of a control unit 40 for controlling the voltage applied to the liquid crystal panel 17. The control unit 40 is electrically connected to the optical pickup. Specifically, a reproduction signal 22a from the detector 22 of the optical pickup 10 shown in FIG. 7 is amplified by an amplifier 42 and supplied to a controller 43. The reproduction signal 22a includes an RF signal, a push-pull signal, an LPP (Land PrePit) signal and so on. The controller 43 may be a computer such as a CPU.

A memory 44 stores the bias voltages Vbb1 and Vbred for the aforementioned BD, DVD and CD, and these bias voltages are read out by the controller 43.

The controller 43 determines a kind of the disc based on the reproduction signal 22a obtained from the detector 22. Specifically, each of the BD, DVD and CD has different reflectivity so that the controller 43 determines whether the disc to be recorded or reproduced is the BD, DVD or CD based on the magnitude of the RF signal included in the reproduction signal and provides a determination result to a control voltage generating unit 45. The controller 43 also detects the disc tilt angle (disc tilt amount) in a radial direction based on the push-pull signal and so on, and calculates a necessary correction amount so as to supply it to the control voltage generating unit 45.

The control voltage generating unit 45 determines the voltage to be applied to the electrode portions of the liquid crystal panel 17 (referred to as a "correction voltage") based on the bias voltages read from the memory 44 and the correction amount of the disc tilt supplied from the controller 43 so as to supply it to a liquid crystal driver 46. The liquid crystal driver 46 applies the supplied correction voltage to the electrode portions of the liquid crystal panel 17. Thus, the phase difference for canceling the aberration by caused the disc tilt in the radial direction detected by the controller 43 is given to the laser beam transmitted through the liquid crystal panel 17, and the aberration is corrected.

The memory 44 has the bias voltages for the BD, DVD and CD stored therein, respectively. These bias voltages are determined independently by the wavelength of the laser beam to be used. The control voltage generating unit 45 generates the correction voltage, based on the determination result of the kind of the disc by the controller 43, with using the bias voltage corresponding to the disc as a reference.

Figure 10:
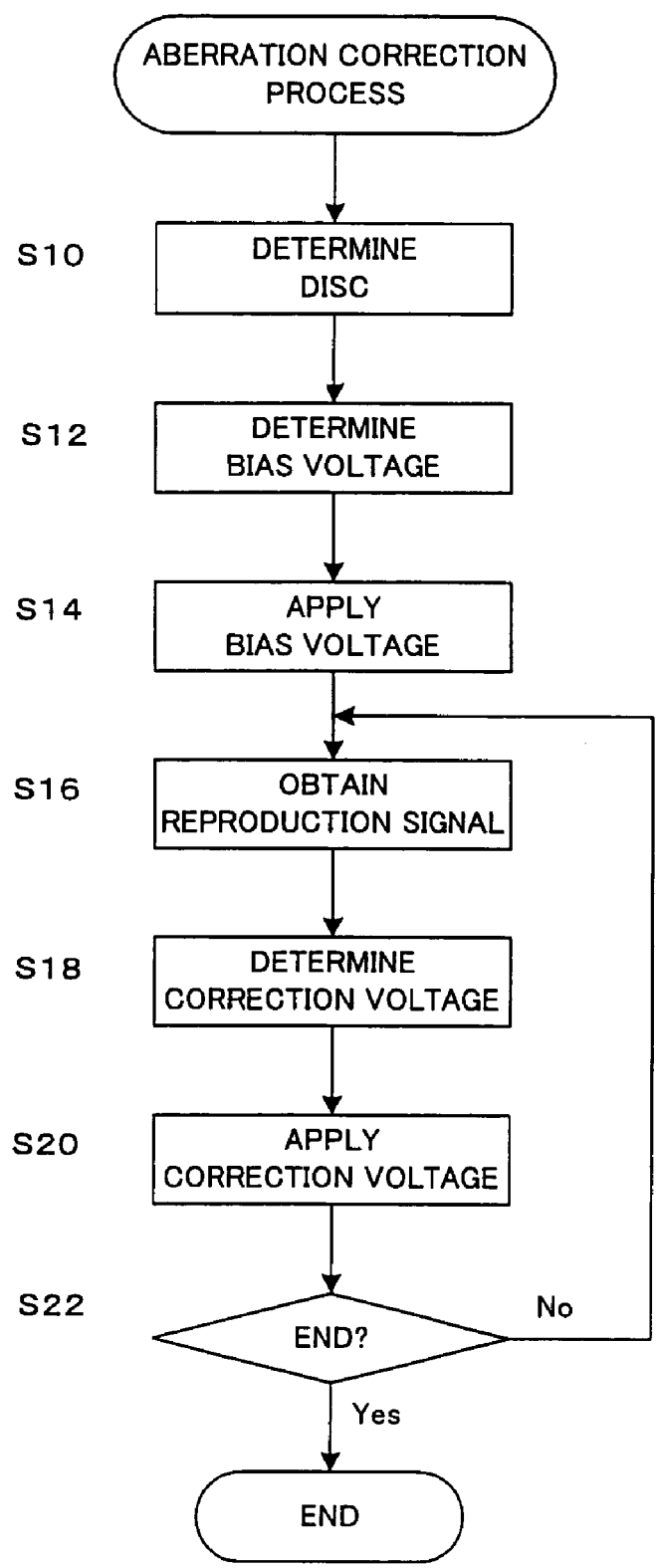
FIG. 10 is a flow chart of an example of an aberration correction process by the disc tilt.

FIG. 10 shows a flowchart of a tilt correction process. This process is implemented by having a microcomputer mounted on a drive apparatus of the disc execute a program prepared in advance and operate as the controller 43 and control voltage generating unit 45 shown in FIG. 9.

First, when the optical disc is inserted into the drive apparatus, the controller 43 determines the kind of the disc based on the light volume of the RF signal and a focus error signal (step S10). The determination result is supplied to the control voltage generating unit 45. The controller 43 reads the bias voltage corresponding to the disc from the memory 44 according to the determination result of the kind of the disc and supplies it to the control voltage generating unit 45.

The control voltage generating unit 45 determines the bias voltage (step S12), and drives the liquid crystal driver 46 to apply the bias voltage to the liquid crystal panel 17 (step S14). Once the bias voltage is applied, a focus servo and a tracking servo are turned on. The control voltage generating unit 45 obtains the reproduction signal from the disc (step S16), and decides the correction voltage based on the tracking error signal and the magnitude of the RF signal included therein (step S18) so as to apply the correction voltage (step S20). Thus, the aberrations generated by the disc tilt and the error due to the thickness of the cover layer of the disc are corrected. The process from step S16 to S20 is repeated until the recording and/or reproduction of the disc is finished.

If another optical disc is inserted into the drive apparatus, the kind of the disc is determined by the above process, and the driving voltage of the liquid crystal panel 17 is switched to the bias voltage suited to that disc. Thus, whichever disc is recorded and/or reproduced, each electrode of the liquid crystal panel 17 is driven by the bias voltage suited to the disc so that the aberration correction becomes possible to any disc with high resolution.

Second Embodiment

Next, a second embodiment will be explained. When the aberration caused by the disc tilt is corrected on the recording-type optical disc, if the recording and reproduction apparatus includes no disc tilt detecting unit such as the tilt sensor, there is a method of performing the aberration correction by applying the voltage to the liquid crystal panel based on the disc tilt angle profile of the disc obtained in advance. In this embodiment, the bias voltage is set so that the correction voltages applied to the liquid crystal panel for generating the same aberration on different discs become the same. Thereby, the accuracy of the obtained disc tilt angle profile can be improved, and the aberration correction with high accuracy becomes possible.

First, the description will be given of a method of obtaining the disc tilt angle profile with reference to FIGS. 11A to 11D and FIGS. 12A to 12D. FIGS. 11A to 11D and FIGS. 12A to 12D are diagrams for explaining the method of obtaining the disc tilt angle profile. When the disc tilt angle profile is obtained, the aberration is generated by applying the plural predetermined voltages to the liquid crystal panel at the time of loading the disc. Based on the variation of the magnitude of the reproduction signal (e.g., push-pull signal, wobble signal, RF signal, LPP signal and the like) at the time, the relation between the applied voltage and the magnitude of the reproduction signal is obtained by the approximation of a high order function. By using the function, the disc tilt angle at a certain radius position on the disc is estimated. The obtained disc tilt angle profile is stored for each radius position.

Figure 11A:
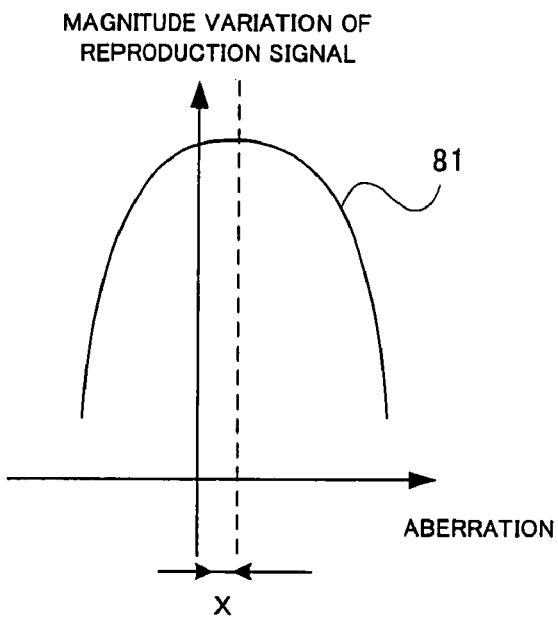
FIGS. 11A to 11D are diagrams explaining a producing method of a disc tilt angle profile.

The detailed explanation will be given with reference to FIGS. 11A to 11D. Logically, a relation (hereinafter referred to as "voltage/magnitude curve") between the aberration of the laser light irradiated onto the disc and the magnitude of the reproduction signal is generally given as a parabola (quadric) 81 as shown in FIG. 11A. If there is no disc tilt, when the aberration is zero, the magnitude of the reproduction signal is maximum. In addition, as the positive or negative aberration increases, the magnitude of the reproduction signal decreases. On the contrary, when the disc tilt exists, as shown in FIG. 11A, a shift X occurs onto the voltage/magnitude curve. Namely, the shift X corresponds to the disc tilt angle amount at the radius position, and by giving the correction voltage correspondent to the shift X, the aberration can be corrected.

Figure 11B:
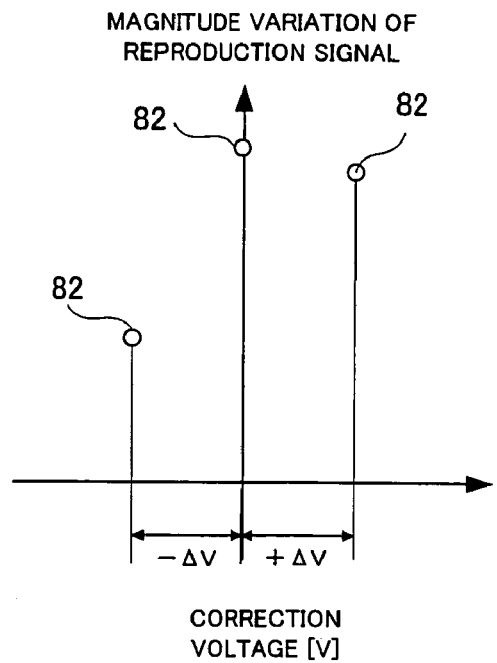
Figure 11C:
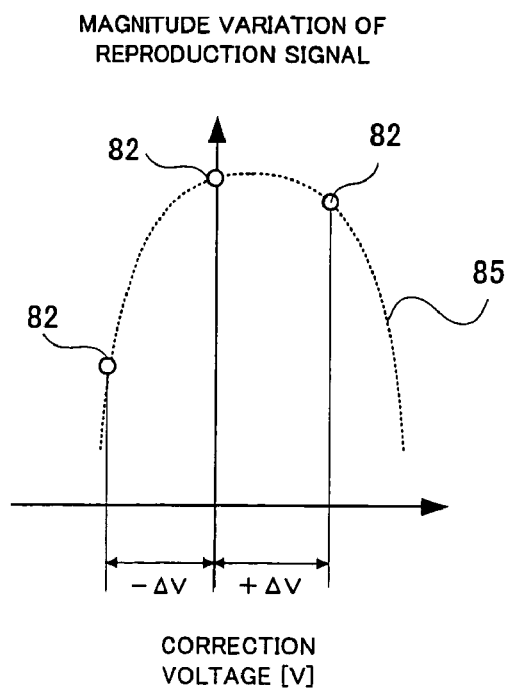
Figure 11D:
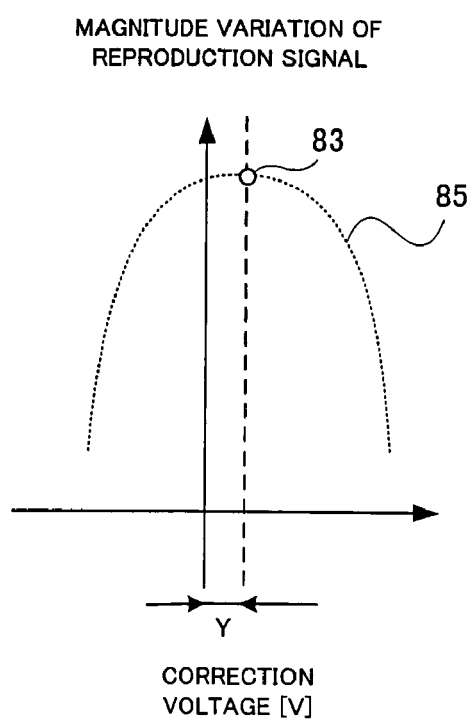

Actually, when the disc is loaded, the voltage/magnitude curve is estimated. For example, as shown in FIG. 11B, by applying a predetermined voltage ($\pm \Delta V$) to the liquid crystal panel for the aberration correction, the magnitudes of the reproduction signal at three points in a case that the correction voltage is 0V and $\pm \Delta V$ are detected, and three points 82 are obtained. As shown in FIG. 11C, a voltage/magnitude curve 85 passing through these three points is estimated by the parabolic approximation. Then, a maximum point 83 of the obtained voltage/magnitude curve 85 is determined, and a shift quantity Y at the maximum point 83 is determined as the appropriate correction voltage at the radius position.

The process is executed for the plural predetermined radius positions in the disc radius direction, and the respective correction voltages Y are stored. Thus, producing the disc tilt angle profile is completed. Afterward, at the time of recording and reproduction of the disc, the correction voltage is determined based on the radius position of the pickup, and the aberration correction is performed by the liquid crystal panel.

In a case of an apparatus for recording and reproducing different kinds of discs such as the BD and the DVD, it is not preferable that the magnitude variations of the reproduction signals corresponding to the applied voltages at the time of applying the same correction voltage are different between the BD and the DVD. This is because the dynamic range of the control circuit must be widely maintained for corresponding to both of the BD and the DVD.

Figure 12A:
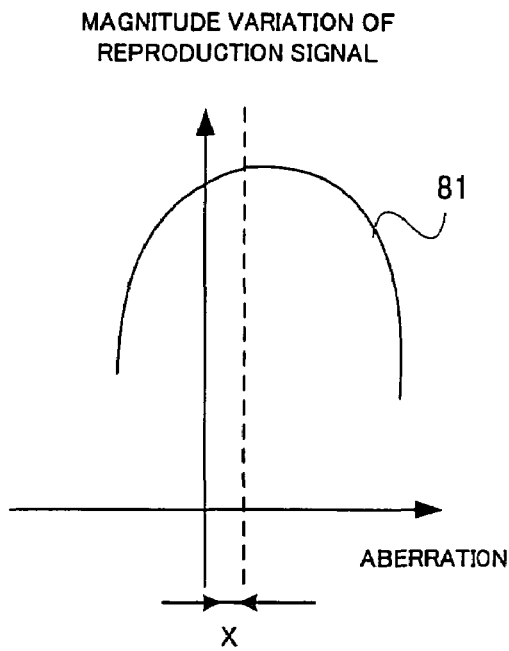
FIGS. 12A to 12D are diagrams explaining the producing method of the disc tilt angle profile.
Figure 12B:
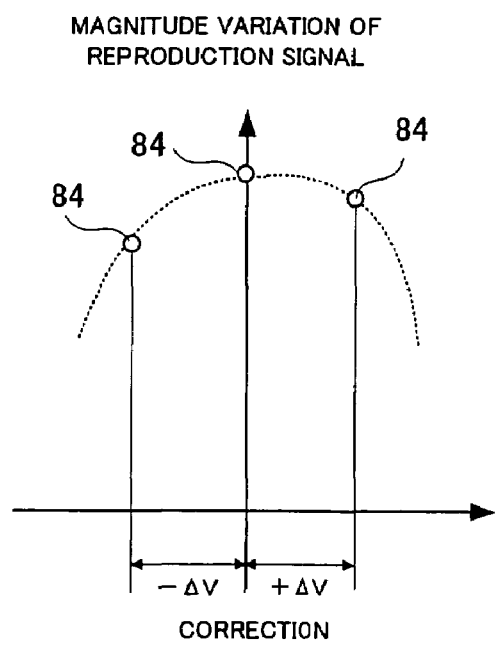
Figure 12C:
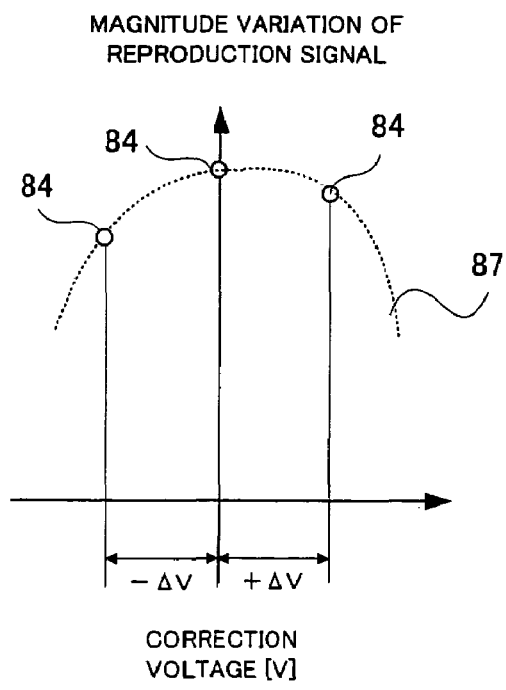
Figure 12D:
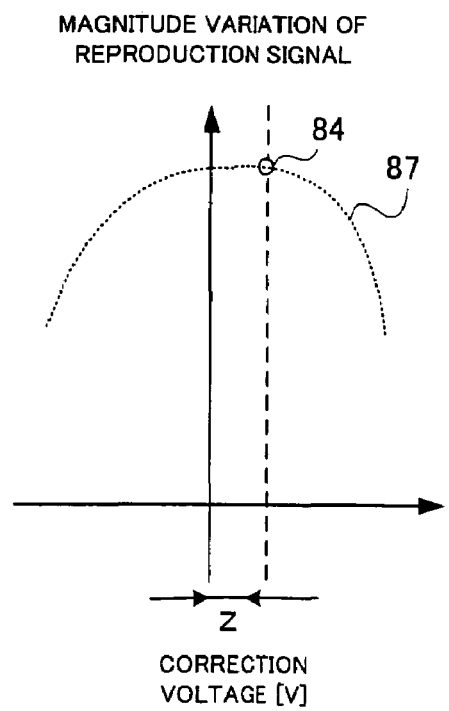

When the wavelength having low variation rate (hereinafter also referred to as "voltage-aberration sensitivity") of the aberration correspondent to the variation of the voltage is used, such as the case of the DVD, since the variation of the reproduction signal magnitude in the case that the same correction voltage is applied is small, an error may occur to the approximation of the voltage/magnitude curve by the high order function approximation. This point will be explained with reference to FIGS. 12A to 12D. Basically, FIGS. 12A to 12D are diagrams showing a producing process of the disc tilt angle profile similarly to FIGS. 11A to 11D. However, FIGS. 12A to 12D show a case that the voltage-aberration sensitivity is small in the DVD. In this case, as shown in FIG. 12B, since the difference of magnitudes among points 84 obtained by applying the predetermined correction voltage is small, an error of the voltage/magnitude curve obtained by the high order function approximation increases (i.e., the curve 81 in FIG. 12A and an estimated curve 87 in FIG. 12C are different), and as shown in FIG. 12D, an obtained correction voltage Z becomes different from the voltage (the voltage correspondent to the shift X in FIG. 12A) correspondent to the actual aberration.

Therefore, in the second embodiment, in the BD and the DVD, each bias voltage is set so that the correction voltage applied to the liquid crystal panel for generating the same aberration becomes equal. Thereby, in the BD and the DVD, the magnitude variations of the reproduction signals at the time of applying the same correction voltage can be identical, and the voltage/magnitude curves of the BD and the DVD become almost similar. Thereby, it becomes possible that there occurs no difference in the estimations of the optimum applied voltages in the BD and the DVD.

Next, the description will be given of a concrete method of setting the bias voltage according to the second embodiment.

Figure 13:
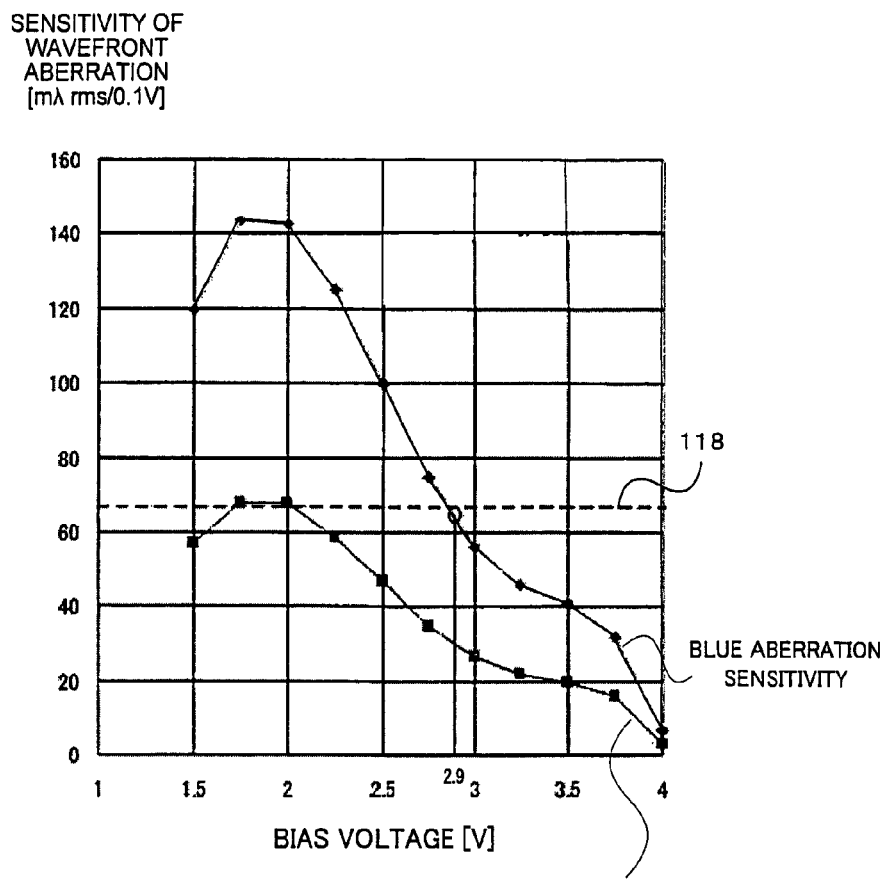
FIG. 13 is a graph showing the relation between the bias voltage and a sensitivity of the aberration, as for the BD and the DVD.

FIG. 13 shows a relation (hereinafter referred to as "sensitivity of the aberration") between the bias voltage and the wavefront aberration (coma aberration) generated on the liquid crystal panel in a case that the voltage of 0.1V is applied to the electrode of the liquid crystal panel. The characteristic is obtained by applying, to the coma aberration correction pattern shown in FIG. 1A, the phase difference obtained by the liquid crystal panel for each applied voltage of 0.1V to calculate the wavefront aberration.

As understood from FIG. 13, when the same bias voltage is applied, the wavefront aberration amount generated on the liquid crystal panel in the case that the blue wavelength is used becomes twice as large as the case that the red wavelength is used. Namely, even when the same correction voltage is applied to the liquid crystal panel by the control circuit, the magnitude variation of the reproduction signal of the BD becomes larger than that of the DVD. However, as shown in FIG. 13, when the bias voltages of the red wavelength and the blue wavelength are set to 2.0V and 2.9V, respectively, as shown by a broken line 118, it is understood that the sensitivities of the aberrations of the red wavelength and the blue wavelength become almost the same. Like this, by setting the bias voltages of the red wavelength and the blue wavelength, respectively, to make the sensitivities of the aberrations the same, the aberrations generated by the liquid crystal panel in the BD and the DVD at the time of applying the same voltage can be the same.

Figure 14:
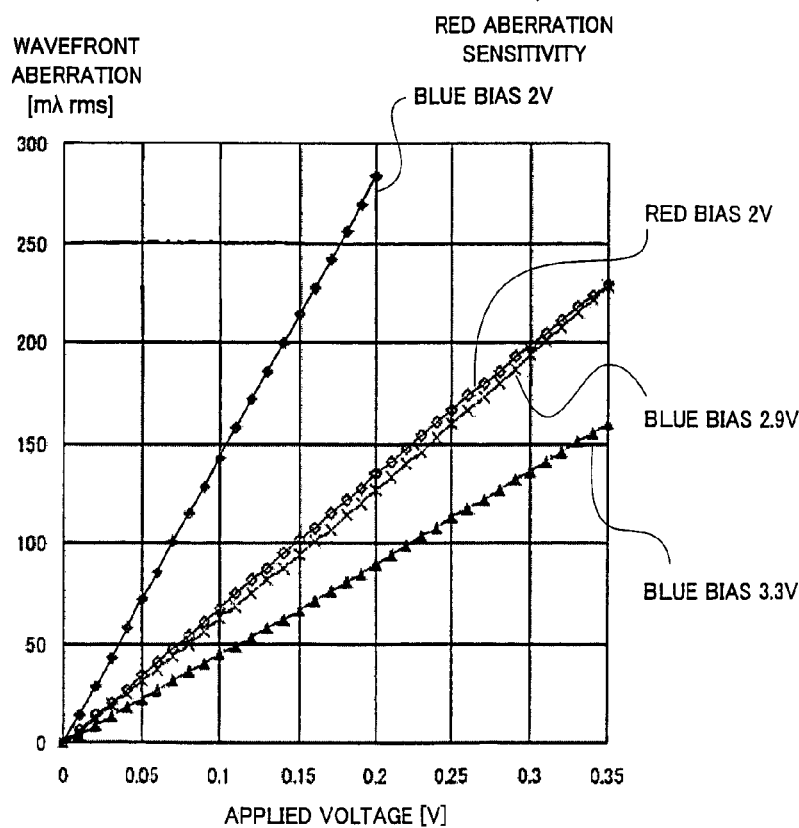
FIG. 14 is a graph showing the relation between the applied voltage and the wavefront aberration, as for the BD and the DVD.

FIG. 14 shows a relation between the applied voltage and the wavefront aberration in a case that the biases of the red wavelength and the blue wavelength are varied as described above. When the bias voltages of the red wavelength and the blue wavelength are set to 2.0V and 2.9V respectively, the relation between the applied voltage and the wavefront aberration becomes almost the same. A point at which the bias voltage of the red wavelength is 2.0V corresponds to the point 96 in FIG. 3A, and a point at which the bias voltage of the blue wavelength is 2.9V corresponds to the point 94 in FIG. 3A. From FIGS. 3A and 3B, it is understood that the high point of the sensitivity of the phase difference of the red wavelength and the low point of the sensitivity of the phase difference of the blue wavelength are combined and used in the setting.

In terms of a numerical formula, when the aberration voltages in the blue wavelength and the red wavelength shown in FIG. 13 are defined as follows:

Aberration difference sensitivity in blue wavelength:

$$\Delta Ab1 = f(Vbb1)$$

Aberration difference sensitivity in red wavelength:

$$\Delta Ared = f(Vbred) \quad (6),$$

by setting the bias voltages Vbb1 and Vbred to realize that:

$$\Delta Ab1 = \Delta Ared \quad (7),$$

the same wavefront aberration can be given with the same applied voltage in the BD and the DVD. Therefore, it becomes unnecessary that the control voltage of the liquid crystal panel is widely maintained. In producing the above-mentioned disc tilt angle profile, the estimation error of the voltage/magnitude curve can be prevented.

The configuration and operation of the optical pickup to which the second embodiment is applied is basically similar to the optical pickup of the first embodiment explained with reference to FIG. 7 to FIG. 9. In the second embodiment, as described above, each bias voltage is set so that the correction voltage applied to the liquid crystal panel becomes equal in order to generate the same aberration. In such the state, as shown in FIGS. 11A to 11D, the disc tilt angle profile is estimated, and the applied voltage for the aberration correction is obtained at each predetermined radius position of the disc. At the time of recording and reproduction of the disc, based on the radius direction position of the pickup, the correction voltage is determined with reference to the disc tilt angle profile, and the aberration correction is performed.

[Modification]

The above embodiments use the optical pickup having the light source of a plurality of wavelengths. However, application of the present invention is not limited to this. Namely, even in the case of the optical pickup having only the light source of a single wavelength, it is sufficient to set the bias voltage applied to the liquid crystal panel for aberration correction so that the phase difference generated by the liquid crystal panel may become an integral multiple of the single wavelength.

Even when the optical pickup having the light source of a plurality of wavelengths is used, in case of correcting the aberrations by the liquid crystal panel for the laser beams of certain wavelengths only, it is possible to apply the present invention only to the laser beams of the wavelengths which are subjected to the aberration correction.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2004-203048 filed on Jul. 9, 2004 including the specification, claims, drawings and summary is incorporated herein by reference in its entirety.

What is claimed is:

1. An aberration correction apparatus, comprising:
   an optical pickup having a liquid crystal panel which i) gives a phase difference to a light beam, the light beam emitted from a light source unit and irradiated onto a recording medium, and ii) corrects an aberration occurring to the light beam; and
   a control unit configured to apply, to the liquid crystal panel, a correction voltage corresponding to an amount of the aberration in reference to a bias voltage, wherein the bias voltage is set to each one of a plurality of different kinds of recording mediums so that the correction voltage applied for correcting the aberration caused by a disc tilt of a same amount is equal for each of the different kinds of recording mediums.

2. The aberration correction apparatus according to claim 1, wherein,
a wavelength of the light beam is different for each of the different kinds of recording mediums, and
a first bias voltage, set to one of the different kinds of recording mediums using a wavelength having a high sensitivity of the phase difference, is higher than a second bias voltage set to another of the different kinds of recording mediums using a wavelength having a low sensitivity of the phase difference.

3. The aberration correction apparatus according to claim 2, wherein the sensitivity of the phase difference is a rate of a variation of the phase difference generated by the liquid crystal panel with respect to a variation of a voltage applied to the liquid crystal panel.

4. The aberration correction apparatus according to claim 1, wherein,
the light source unit emits plural light beams having different wavelengths, and
the bias voltage is different for each wavelength of the light beam.

5. The aberration correction apparatus according to claim 1, wherein the control unit includes:
a storage unit which stores the bias voltage;
a correction voltage determining unit which determines the correction voltage; and
a correction voltage applying unit which applies the correction voltage to the liquid crystal panel.

6. An aberration correction apparatus, comprising:
an optical pickup having a liquid crystal panel which i) gives a phase difference to a light beam, the light beam emitted from a light source unit and irradiated onto a recording medium, and ii) corrects an aberration occurring to the light beam; and
a control unit configured to apply, to the liquid crystal panel, a correction voltage corresponding to an amount of the aberration in reference to a bias voltage,
wherein the bias voltage is set to each one of a plurality of different kinds of recording mediums so that the correction voltage applied for generating the aberration of a same amount is equal for each of the different kinds of recording mediums.

7. The aberration correction apparatus according to claim 6, wherein,
a wavelength of the light beam is different for each of the recording mediums, and
a first bias voltage, set to one of the different kinds of recording mediums using a wavelength having a high sensitivity of the aberration, is higher than a second bias voltage set to another of the different kinds of recording mediums using a wavelength having a low sensitivity of the aberration.

8. The aberration correction apparatus according to claim 7, wherein the sensitivity of the aberration is a rate of a variation of the aberration generated by the liquid crystal panel with respect to a variation of a voltage applied to the liquid crystal panel.

9. The aberration correction apparatus according to claim 6, further comprising:
a first unit which i) applies an applied voltage of a predetermined number based on the bias voltage set to each of the different recording mediums at predetermined radius positions of the recording medium and ii) obtains reproduction signal magnitude values of the predetermined number;
a second unit which obtains a relation between the reproduction signal magnitude values and the applied voltage by an approximation operation using the reproduction signal magnitude value for each radius position, and produces a disc tilt angle profile of each of the different recording mediums; and
a correction unit which corrects the aberration based on the produced disc tilt angle profile.

10. A control apparatus of an optical pickup having a liquid crystal panel which gives a phase difference to a light beam, emitted from a light source unit and irradiated onto a recording medium, and corrects an aberration occurring to the light beam, the control apparatus comprising:
a control unit, having a memory storing a plurality of bias voltages, which applies a correction voltage to the liquid crystal panel corresponding to an amount of the aberration in reference to a selected one of the stored bias voltages,
wherein each of the stored bias voltages is set to each one of a plurality of different kinds of recording mediums, so that the correction voltage applied for correcting the aberration caused by a disc tilt of a same amount is equal for each of the different kinds of recording mediums.

11. A control apparatus of an optical pickup having a liquid crystal panel which gives a phase difference to a light beam, emitted from a light source unit and irradiated onto a recording medium, and corrects an aberration occurring to the light beam, the control apparatus comprising:
a control unit, having a memory storing a plurality of bias voltages, which applies a correction voltage to the liquid crystal panel corresponding to an amount of the aberration in reference to a selected one of the stored bias voltages,
wherein each of the stored bias voltages is set to each one of a plurality of different kinds of recording mediums, so that the correction voltage applied for generating the aberration of a same amount is equal for each of the different kinds of recording mediums.

12. A control method of an optical pickup having a liquid crystal panel which gives a phase difference to a light beam, emitted from a light source unit and irradiated onto a recording medium, and corrects an aberration occurring to the light beam, the method comprising the steps of:
applying, to the liquid crystal panel, a correction voltage corresponding to an amount of the aberration in reference to a bias voltage; and
setting the bias voltage to each one of a plurality of different kinds of recording mediums so that the correction voltage applied for correcting the aberration caused by a disc tilt of a same amount is equal for each of the different kinds of recording mediums.

13. A control method of an optical pickup having a liquid crystal panel which gives a phase difference to a light beam, emitted from a light source unit and irradiated onto a recording medium, and corrects an aberration occurring to the light beam, the method comprising the steps of:
applying, to the liquid crystal panel, a correction voltage corresponding to an amount of the aberration in reference to a bias voltage; and
setting the bias voltage to each one of a plurality of different kinds of recording mediums so that the correction voltage applied for generating the aberration of a same amount is equal for each of the different kinds of recording mediums.

14. A computer program product in a computer-readable medium executed by a computer to make the computer function as a control unit for an optical pickup, the optical pickup comprising a liquid crystal panel which i) gives a phase difference to a light beam, emitted from a light source unit and irradiated onto a recording medium, and ii) corrects an aberration occurring to the light beam, the computer program product causing the computer to:

retrieve, from a memory, a bias voltage; and apply, to the liquid crystal panel, a correction voltage corresponding to an amount of the aberration in reference to the bias voltage, wherein the bias voltage is set to each one of a plurality of different kinds of recording mediums so that the correction voltage applied for correcting the aberration caused by a disc tilt of a same amount is equal for each of the different kinds of recording mediums.

15. A computer program product in a computer-readable medium to make the computer function as a control unit for an optical pickup, the optical pickup having a liquid crystal panel which i) gives a phase difference to a light beam, emitted from a light source unit and emitted onto a recording medium, and ii) corrects an aberration occurring to the light beam, the computer program product causing the computer to:

retrieve, from a memory, a bias voltage; and apply, to the liquid crystal panel, a correction voltage corresponding to an amount of the aberration in reference to the bias voltage, wherein the bias voltage is set to each one of a plurality of different kinds of recording mediums so that the correction voltage applied for generating the aberration of a same amount is equal for each of the different kinds of recording mediums.

* * * * *